United States Patent
Albano et al.

(10) Patent No.: US 10,846,420 B2
(45) Date of Patent: Nov. 24, 2020

(54) DOMAIN CONTROLLER AGENT SUBSCRIPTION TO KERBEROS EVENTS FOR RELIABLE TRANSPARENT IDENTIFICATION

(71) Applicant: Forcepoint LLC, Austin, TX (US)

(72) Inventors: Anderson S. Albano, Chula Vista, CA (US); Michael C. Madigan, San Diego, CA (US); Shuo Li, San Diego, CA (US); Xiaoyue Fan, San Diego, CA (US)

(73) Assignee: FORCEPOINT LLC, Austin, TX (US)

( * ) Notice: Subject to any disclaimer, the term of this patent is extended or adjusted under 35 U.S.C. 154(b) by 174 days.

(21) Appl. No.: 16/023,298

(22) Filed: Jun. 29, 2018

(65) Prior Publication Data

US 2020/0004978 A1    Jan. 2, 2020

(51) Int. Cl.
| | | |
|---|---|---|
| *H04L 29/06* | (2006.01) | |
| *G06F 21/62* | (2013.01) | |
| *H04L 29/08* | (2006.01) | |
| *G06F 21/45* | (2013.01) | |

(52) U.S. Cl.
CPC .......... *G06F 21/6218* (2013.01); *G06F 21/45* (2013.01); *H04L 63/101* (2013.01); *H04L 63/102* (2013.01); *H04L 63/20* (2013.01); *H04L 67/20* (2013.01); *H04L 67/24* (2013.01); *G06F 2221/2141* (2013.01)

(58) Field of Classification Search
CPC .................. G06F 21/6218; G06F 21/45; G06F 2221/2141; H04L 63/101; H04L 63/102; H04L 63/20; H04L 67/20; H04L 67/24
See application file for complete search history.

(56) References Cited

U.S. PATENT DOCUMENTS

| | | | |
|---|---|---|---|
| 5,983,270 A | * | 11/1999 | Abraham ................ H04L 29/06 709/224 |
| 7,496,750 B2 | | 2/2009 | Kumar et al. |
| 7,996,556 B2 | | 8/2011 | Raghavan et al. |
| 8,266,327 B2 | | 9/2012 | Kumar et al. |
| 8,369,967 B2 | | 2/2013 | Hoffberg et al. |
| 8,498,941 B2 | | 7/2013 | Felsher |
| 8,516,266 B2 | | 8/2013 | Hoffberg et al. |
| 8,600,895 B2 | | 12/2013 | Felsher |
| 10,257,162 B2 | * | 4/2019 | Pai ...................... H04L 12/2803 |
| 10,263,868 B1 | * | 4/2019 | Baldi .................. H04L 43/0876 |
| 2007/0136603 A1 | | 6/2007 | Kuecuekyan |

(Continued)

FOREIGN PATENT DOCUMENTS

| | | |
|---|---|---|
| EP | 1839160 B1 | 3/2018 |
| KR | 20040020933 | 3/2004 |

*Primary Examiner* — Ghodrat Jamshidi
(74) *Attorney, Agent, or Firm* — Jackson Walker LLP; Christopher J. Rourk

(57) ABSTRACT

A system for identifying network users is provided that includes a domain controller agent having a user map that is configured to receive user data, to save the user data in an updated user map and to replace the user map with the updated user map. A filtering service has the user map and is configured to receive the updated user map and to replace the user map with the updated user map. An event subscription system is configured to generate event subscription data, wherein the domain controller agent is configured to subscribe to the event subscription system and to receive the event subscription data.

20 Claims, 2 Drawing Sheets

(56) References Cited

U.S. PATENT DOCUMENTS

| | | | | |
|---|---|---|---|---|
| 2008/0114862 A1* | 5/2008 | Moghaddam | ......... | G06F 16/957 |
| | | | | 709/220 |
| 2009/0022295 A1* | 1/2009 | Hou | ...................... | H04L 63/102 |
| | | | | 379/207.02 |
| 2010/0094952 A1* | 4/2010 | Lindgren | ............... | G06Q 10/06 |
| | | | | 709/219 |
| 2011/0161397 A1* | 6/2011 | Bekiares | ................. | H04L 67/24 |
| | | | | 709/203 |
| 2014/0201564 A1* | 7/2014 | Jagtiani | ................. | G06F 11/203 |
| | | | | 714/4.11 |
| 2017/0339102 A1* | 11/2017 | Chhuor | ............... | H04L 61/2015 |
| 2018/0248866 A1* | 8/2018 | Zhang | ................. | H04L 63/0815 |
| 2019/0089843 A1* | 3/2019 | Zhou | ........................ | H04L 45/38 |

\* cited by examiner

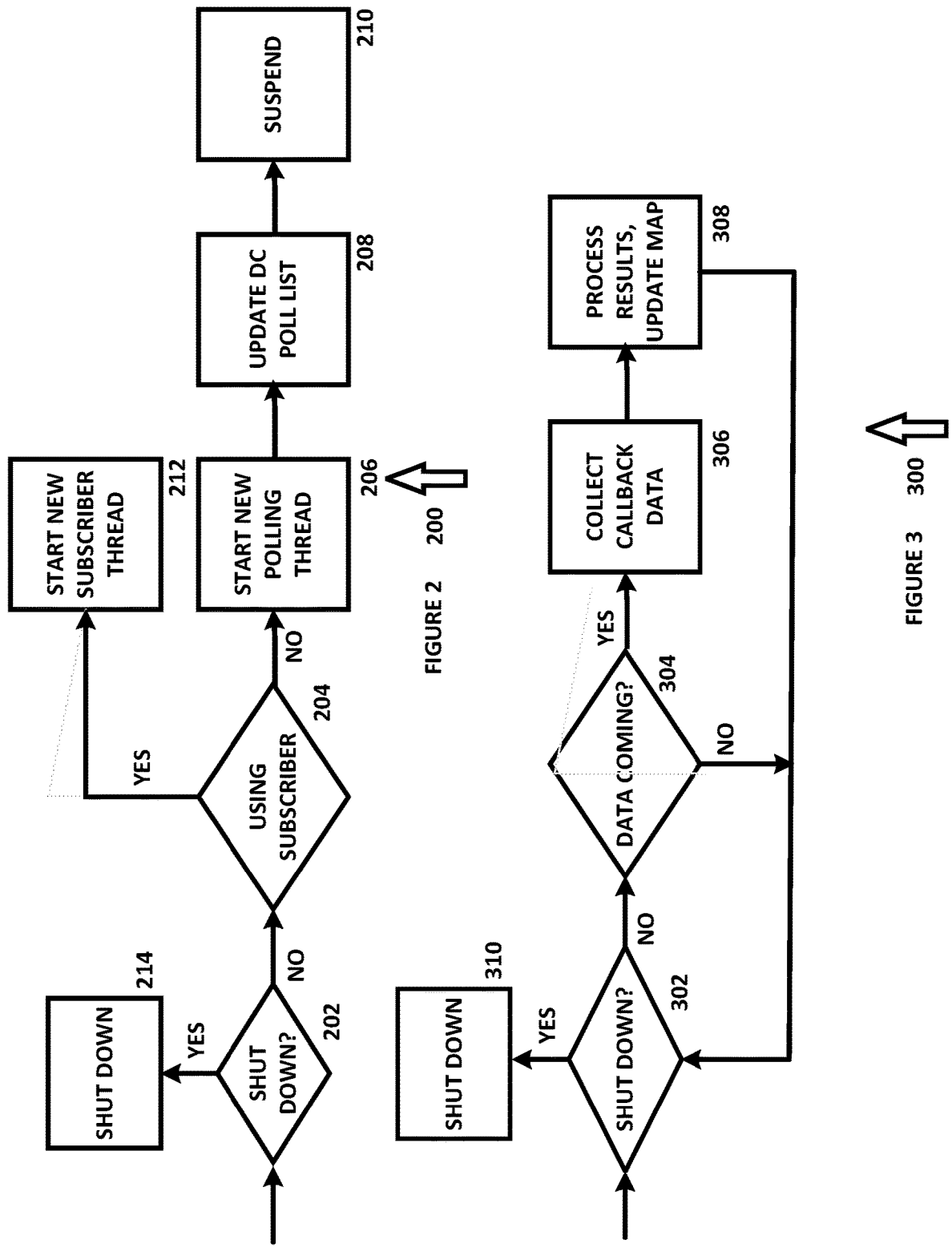

DOMAIN CONTROLLER AGENT SUBSCRIPTION TO KERBEROS EVENTS FOR RELIABLE TRANSPARENT IDENTIFICATION

TECHNICAL FIELD

The present disclosure relates generally to systems and methods for identifying network users, and more specifically to a system and method for identifying network users that uses event subscription instead of polling.

BACKGROUND OF THE INVENTION

Management of network access is important for security, and polling of network users is typically used to manage network access.

SUMMARY OF THE INVENTION

A system for identifying network users is provided that includes a domain controller agent having a user map that is configured to receive user data, to save the user data in an updated user map and to replace the user map with the updated user map. A filtering service has the user map and is configured to receive the updated user map and to replace the user map with the updated user map. An event subscription system is configured to generate event subscription data, wherein the domain controller agent is configured to subscribe to the event subscription system and to receive the event subscription data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 2 is a diagram of an algorithm for event subscription based domain controller user identification, in accordance with an example embodiment of the present disclosure; and FIG. 3 is a diagram of an algorithm for event subscription based domain controller user identification, in accordance with an example embodiment of the present disclosure.

DETAILED DESCRIPTION OF THE INVENTION

Figure 1:
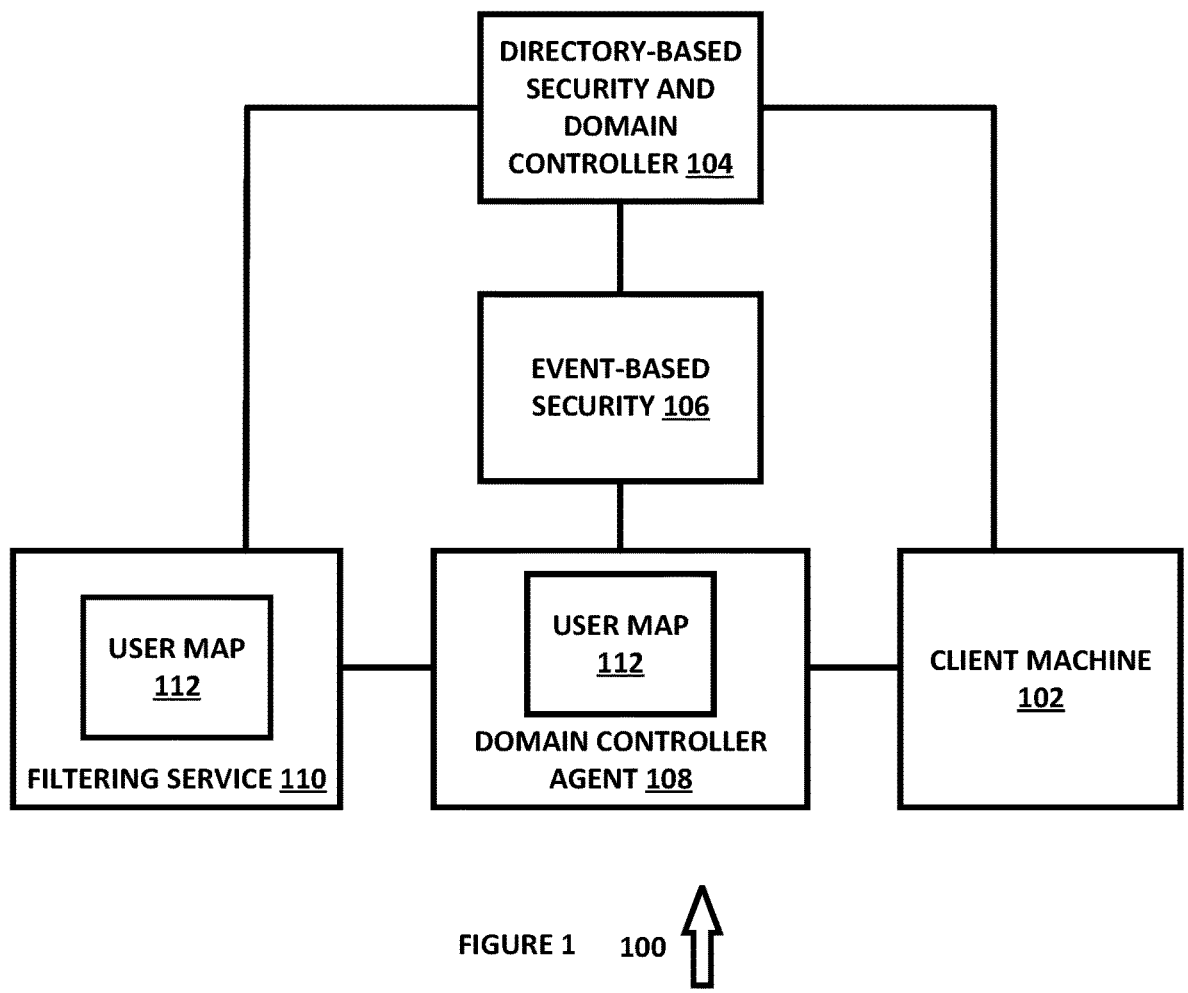
FIG. 1 is a diagram of a system for event subscription based domain controller user identification, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Network security can be provided using different systems and components. In a Microsoft Windows or Windows NT network, a server platform that operates domain controller software is often used to control host access to Windows domain resources. The domain controller can be used in conjunction with the Windows Active Directory service to authenticate users, store user account information, enforce security policies and for other functions.

In particular, the Windows Active Directory service is a network-based service that is used to provide basic network security functions. In order for a user device to access a network, it must typically access directory-based files and services, such that network security can be provided by controlling access to those files and services. As such, while the Windows Active Directory service is provided as an example of a type of directory-based network security service that is relevant to the present disclosure, other suitable directory-based network security services can also or alternatively be used.

Another type of security service is a domain controller, which can be used alone or in conjunction with a directory-based network security service. A domain controller agent operating on a separate server can be used to identify network users and their Internet protocol (IP) addresses. The domain controller agent can periodically poll another service such as Microsoft Active Directory for new logon sessions, and can then retrieve user and IP information based on those service entries. However, if the other service releases a new version of the software that changes the functionality of the service, then the polled functionality can become unavailable or unreliable. Polling for identification of network users for a domain controller also suffers from other shortcomings.

In view of these problems, one technical feature that has been identified as an alternate solution to replace polling by the domain controller is to use event subscription. For example, the domain controller agent can be configured to implement one or more algorithms that subscribe to a ticket service to authenticate users, instead of using polling. In this example, a client can authenticate itself to an authentication service using an authentication algorithm or algorithms, such as the Kerberos authentication server or other suitable authentication servers, which can then forward the username to the key distribution center (KDC). The KDC can issue a ticket-granting ticket (TGT) using one or more algorithms, which can include a time stamped and encrypted using a secret key from a ticket-granting service (TGS). Outlook access events and other suitable events can also or alternatively be used. When these events occur, the domain controller agent can use one or more algorithms to extract user information and IP address information from the associated event objects. The use of event subscription provides the technical advantage of allowing configuration of which events identifiers should be subscribed to, and can include user-configurability and other events than the ones identified herein. In addition, event-based domain controller functionality can support different platforms and operating systems, for example, when clients are integrated with a suitable service such as Active Directory or other directory-based security.

The present disclosure thus provides a reliable and accurate method for transparent identification of user names and associated IP addresses. User name and IP address identification can also be used for web filtering if other forms of identification are not available, and also as backup. Web policies associated with web filtering can be applied to requests from users that can be part of reporting, risk adaptive protection or other suitable functions.

FIG. 1 is a diagram of a system 100 for event subscription based domain controller user identification, in accordance with an example embodiment of the present disclosure. System 100 includes client machine 102, directory-based security and domain controller 104, event-based security 106, domain controller agent 108, filtering service 110 and user map 112, each of which can be implemented in hardware or a suitable combination of hardware and software.

Client machine 102 can be implemented as a special purpose processor that is configured to interact with the other system components shown. In one exemplary embodiment, client machine 102 can include one or more algorithms having predetermined functionality, and can receive data and/or one or more additional algorithms as part of the process of being authenticated to access the data and services on the network provided by system 100.

Directory-based security and domain controller 104 can be implemented using algorithms available from the Windows® Active Directory® domain controller or other suitable algorithms that are functionally equivalent to those algorithms. In particular, the functions performed by the algorithms associated with directory-based security and domain controller 104 include user identification, IP address identification and other suitable functions.

Event-based security 106 can be implemented using algorithms available as part of the Kerberos authentication services suite, including but not limited to Kerberos KDC, TGT, TGS or other suitable Kerberos algorithms, or other suitable event-based security algorithms. In particular, the functions performed by the algorithms associated with event-based security 106 include event subscription based services.

Domain controller agent 108 can be implemented using algorithms available as part of the Forcepoint DC Agent services suite. In particular, the functions performed by the algorithms associated with domain controller agent 108 include the user map and updated user map functionality described herein.

Filtering service 110 can be implemented using algorithms available as part of the Forcepoint filtering services suite. In particular, the functions performed by the algorithms associated with filtering service 110 include the user map and updated user map functionality described herein.

User map 112 can be implemented as a data structure that is used to authenticate a user, and can include user identification data, IP address data, access time data and other suitable data. User map 112 can be updated in conjunction with network security processes or in other suitable manners, such as disclosed herein.

When a user logs into client machine 012, such as by using a Windows client with an associated network account or in other suitable manners, event-based security 106 can be used as the underlying authentication mechanism to directory-based security and domain controller 104. Directory-based security and domain controller 104 can implement one or more algorithms to log the user into the network and to subscribe to an event, such as for a Kerberos TGT step or other suitable events. When the end user logs on, directory-based security and domain controller 104 can implement one or more algorithms that support notification, extraction of the user name and IP from the event information, addition of an entry to user map 112 of directory-based security and domain controller 104 and other suitable functions.

Directory-based security and domain controller 104 can implement one or more algorithms that synchronize user map 112 with a copy of user map 112 within filtering service 110 and that perform other suitable functions. In addition, the algorithms can be configured to a domain user account with domain administrator permission to execute algorithms associated with the domain controller agent. As an alternative to using domain administrator permission, a domain user can be assigned to a group associated with event log reading, and can be provided with read/write permission to the bin folder.

The algorithms can also configured one or more network services to traffic for port 135, such as by enabling Remote Procedure Calls to run directory-based security and domain controller 104 or in other suitable manners.

FIG. 2 is a diagram of an algorithm 200 for event subscription based domain controller user identification, in accordance with an example embodiment of the present disclosure. Algorithm 200 can be implemented in hardware or a suitable combination of hardware and software.

Algorithm 200 begins at 202, where it is determined by a processor whether the client should shut down. If it is determined by the processor that the client should shut down, the algorithm proceeds to 214 and the processor shuts the client down, otherwise the algorithm proceeds to 204 and it is determined by a processor whether a subscriber thread function is used. If it is determined by the processor that a subscriber thread function is used, the algorithm proceeds to 212 where the new subscriber thread is started by the processor, otherwise the algorithm proceeds to 206 where a new polling thread is started by the processor. The algorithm then proceeds to 208 where the domain controller polling list is updated by the processor. The algorithm then proceeds to 210 and the callback threads are suspended by the processor.

Although algorithm 200 is shown as a flow chart with associated data inputs, data outputs and functions that are performed by one or more processors, as is common in the art. Algorithm 200 can also or alternatively be implemented using objected oriented programming, state transition logic or in other suitable manners, as is readily apparent to a person having ordinary skill in the art.

FIG. 3 is a diagram of an algorithm 300 for event subscription based domain controller user identification, in accordance with an example embodiment of the present disclosure. Algorithm 300 can be implemented in hardware or a suitable combination of hardware and software.

Algorithm 300 begins at 302, where it is determined by a processor whether the client should shut down. If it is determined that the client should shut down, the algorithm proceeds to 310 and the processor shuts down the client, otherwise the algorithm proceeds to 304, where it is determined by a processor whether data is coming. If it is determined by the processor that data is not coming, the algorithm returns to 302, otherwise the algorithm proceeds to 306, where callback data is collected by the processor. The algorithm then proceeds to 308.

At 308, the callback data is processed by a processor to extract user name and IP from the callback data, and the user name and IP data is added to the user map by the processor. The algorithm then returns to 302.

Although algorithm 300 is shown as a flow chart with associated data inputs, data outputs and functions that are performed by one or more processors, as is common in the art. Algorithm 300 can also or alternatively be implemented using objected oriented programming, state transition logic or in other suitable manners, as is readily apparent to a person having ordinary skill in the art.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for identifying network users comprising:
    a domain controller agent operating on a processor and having a user map, the domain controller agent configured to receive user data, to save the user data in an updated user map and to replace the user map with the updated user map;
    a filtering service operating on the processor and having the user map, the filtering service configured to receive the updated user map and to replace the user map with the updated user map; and
    an event subscription system operating on the processor and configured to generate event subscription data, wherein the domain controller agent is configured to subscribe to the event subscription system and to receive the event subscription data.

2. The system of claim 1 wherein the domain controller agent is configured to directly interface with a client machine to allow the client machine to access a network.

3. The system of claim 1 further comprising an active directory coupled to the event subscription system and configured to generate the user data.

4. The system of claim 1 wherein the filtering service is a web filtering service configured to control access to the Internet by a client that is operating on the network.

5. The system of claim 1 wherein the user map includes IP address data.

6. The system of claim 1 wherein the updated user map includes IP address data.

7. A method for identifying network users comprising:
    receiving user data at a domain controller agent having a user map;
    saving the user data in an updated user map;
    replacing the user map with the updated user map;
    receiving the updated user map at a filtering service;

replacing the user map with the updated user map at the filtering service;

generating event subscription data at an event subscription system; and subscribing to the event subscription system with the domain controller agent to receive the event subscription data.

8. The method of claim 7 wherein the domain controller agent is configured to directly interface with a client machine to allow the client machine to access a network.

9. The method of claim 7 further configuring an active directory coupled to the event subscription system to generate the user data.

10. The method of claim 7 further comprising configuring a web filtering service to control access to the Internet by a client that is operating on the network.

11. The method of claim 7 wherein the user map includes IP address data.

12. The method of claim 7 wherein the updated user map includes IP address data.

13. A method for identifying network users comprising:

receiving user data at a domain controller agent operating on a first processor and configured to provide event-based security, the domain controller having a user map;

saving the user data in an updated user map;

replacing the user map with the updated user map;

receiving the updated user map at a filtering service operating on a second processor and configured to provide web-filtering services using the user map;

replacing the user map with the updated user map at the filtering service;

generating event subscription data at an event subscription system; and subscribing to the event subscription system with the domain controller agent to receive the event subscription data and using the event subscription data to provide the event-based security.

14. The method of claim 13 wherein the domain controller agent is configured to directly interface with a client machine to provide the event-based security so as to allow the client machine to access a network.

15. The method of claim 13 further configuring an active directory coupled to the event subscription system to generate the user data.

16. The method of claim 13 further comprising configuring a web filtering service to control access to the Internet by a client that is operating on the network.

17. The method of claim 13 wherein the user map includes IP address data.

18. The method of claim 13 wherein the updated user map includes IP address data.

19. The method of claim 13 wherein the updated user map includes IP address data extracted from event objects.

20. The method of claim 13 wherein the domain controller is configured to subscribe to a ticket service to authenticate a user prior to providing the event-based security.

* * * * *